United States Patent
Kerdok et al.

(10) Patent No.: US 10,516,871 B2
(45) Date of Patent: *Dec. 24, 2019

(54) DEPTH BASED MODIFICATION OF CAPTURED IMAGES

(71) Applicant: Intuitive Surgical Operations, Inc., Sunnyvale, CA (US)

(72) Inventors: Amy E. Kerdok, San Jose, CA (US); Wenyi Zhao, Mountain View, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,239

(22) Filed: Dec. 13, 2017

(65) Prior Publication Data

US 2018/0109773 A1 Apr. 19, 2018

Related U.S. Application Data

(63) Continuation of application No. 14/210,936, filed on Mar. 14, 2014, now Pat. No. 9,860,510.

(60) Provisional application No. 61/793,895, filed on Mar. 15, 2013.

(51) Int. Cl.
    *H04N 13/122* (2018.01)
    *H04N 13/271* (2018.01)
    *H04N 13/239* (2018.01)
    *H04N 13/00* (2018.01)

(52) U.S. Cl.
    CPC ......... *H04N 13/122* (2018.05); *H04N 13/239* (2018.05); *H04N 13/271* (2018.05); *H04N 2013/0081* (2013.01)

(58) Field of Classification Search
    CPC ............. H04N 13/122; H04N 13/0018; H04N 13/239; H04N 13/271; H04N 2013/0081
    USPC ......... 382/154, 103; 345/589, 594; 600/476, 600/431; 424/9.6; 348/43, 370, 54
    See application file for complete search history.

(56) References Cited

U.S. PATENT DOCUMENTS

| | | | |
|---|---|---|---|
| 4,942,539 A | 7/1990 | McGee et al. | |
| 5,170,202 A | 12/1992 | Bell | |
| 5,354,314 A | 10/1994 | Hardy et al. | |
| 6,055,330 A * | 4/2000 | Eleftheriadis | G06T 9/007 382/154 |
| 6,154,560 A | 11/2000 | Cothren et al. | |
| 6,320,979 B1 | 11/2001 | Melen | |
| 6,636,755 B2 | 10/2003 | Toida | |
| 6,804,549 B2 | 10/2004 | Hayashi | |

(Continued)

OTHER PUBLICATIONS

Guichard, Frederic et al., "Extended depth-of-field using sharpness transport across color channels," Proceedings of Electronic Imaging, 2009, SPIE, 13 pages.

(Continued)

*Primary Examiner* — Brian P Yenke
*Assistant Examiner* — Sean N. Haiem

(57) ABSTRACT

An imaging system processes images of a plurality of objects which have been captured by an image capture device for display. Normal processing of the images is modified as either a function of a depth corresponding to one or more of the plurality of objects appearing in the captured images relative to the image capture device or as a function of the depth and one or more image characteristics extracted from the captured images. A depth threshold may be used to avoid inadvertent modifications due to noise.

6 Claims, 5 Drawing Sheets

(56) References Cited

U.S. PATENT DOCUMENTS

| | | | |
|---|---|---|---|
| 7,280,633 | B2 | 10/2007 | Cheng et al. |
| 7,559,892 | B2 | 7/2009 | Adler et al. |
| 7,865,230 | B1 | 1/2011 | Sevick-Muraca et al. |
| 8,027,582 | B2 | 9/2011 | Li |
| 8,228,368 | B2 | 7/2012 | Zhao et al. |
| 8,917,905 | B1* | 12/2014 | Dill ............................ A63J 1/02 |
| | | | 382/103 |
| 9,426,444 | B2* | 8/2016 | Guigues .................. G01S 17/89 |
| 2002/0012460 | A1 | 1/2002 | Kochi et al. |
| 2002/0111546 | A1* | 8/2002 | Cook ..................... A61B 5/0059 |
| | | | 600/322 |
| 2002/0175921 | A1* | 11/2002 | Xu ............................ G06K 9/34 |
| | | | 345/589 |
| 2003/0187319 | A1 | 10/2003 | Kaneko et al. |
| 2004/0212725 | A1* | 10/2004 | Raskar ..................... G06T 15/02 |
| | | | 348/370 |
| 2005/0157204 | A1 | 7/2005 | Marks |
| 2006/0106306 | A1 | 5/2006 | Essner et al. |
| 2007/0177817 | A1* | 8/2007 | Szeliski .................. G06T 5/002 |
| | | | 382/275 |
| 2007/0276230 | A1 | 11/2007 | Miwa et al. |
| 2008/0056999 | A1* | 3/2008 | Sharma ................ A61B 5/0059 |
| | | | 424/9.6 |
| 2008/0097198 | A1* | 4/2008 | Miwa ................... A61B 5/0059 |
| | | | 600/431 |
| 2008/0161744 | A1* | 7/2008 | Golijanin ........... A61K 49/0034 |
| | | | 604/20 |
| 2009/0096808 | A1* | 4/2009 | Winn ....................... G06T 11/60 |
| | | | 345/594 |
| 2011/0032328 | A1* | 2/2011 | Raveendran ........... H04N 13/10 |
| | | | 348/43 |
| 2011/0032329 | A1* | 2/2011 | Bauza ................... H04N 13/261 |
| | | | 348/43 |
| 2011/0116692 | A1* | 5/2011 | Dekel ..................... G06T 15/08 |
| | | | 382/128 |
| 2012/0087573 | A1* | 4/2012 | Sharma .............. G06K 9/00771 |
| | | | 382/154 |
| 2012/0127276 | A1* | 5/2012 | Tsai ..................... G06K 9/4671 |
| | | | 348/47 |
| 2012/0130257 | A1* | 5/2012 | Heanue ................ A61B 5/0059 |
| | | | 600/476 |
| 2012/0146902 | A1* | 6/2012 | Adermann ................ G06T 7/20 |
| | | | 345/158 |
| 2012/0183202 | A1* | 7/2012 | Wei ...................... H04N 13/261 |
| | | | 382/154 |
| 2012/0242796 | A1* | 9/2012 | Ciurea ................... H04N 5/232 |
| | | | 348/46 |
| 2013/0136307 | A1* | 5/2013 | Yu .......................... H04N 7/181 |
| | | | 382/103 |
| 2014/0055560 | A1* | 2/2014 | Fu .......................... G06T 5/005 |
| | | | 348/42 |
| 2015/0018690 | A1 | 1/2015 | Kang et al. |
| 2015/0069257 | A1* | 3/2015 | Besson ................. G01T 1/1647 |
| | | | 250/394 |
| 2015/0104394 | A1 | 4/2015 | Abbaci et al. |
| 2015/0208054 | A1* | 7/2015 | Michot ................ H04N 13/366 |
| | | | 348/54 |

OTHER PUBLICATIONS

Kim, Miriam et al., "Computer Assisted 3D Measurements for Micro-Surgery," Proceedings of the Human Factors and Ergonomics Society 41st Annual Meeting, 1997, pp. 787-791, Human Factors and Ergonomics Society.

Lum, Mitchell, Jay, Hiroshi et al., "Kinematic Optimization of a Spherical Mechanism for a Minimally Invasive Surgical Robot," IEEE International Conference on Robotics and Automation, 2004, pp. 829-834, vol. 1, IEEE.

Rosen, Jacob et al., "Spherical Mechanism Analysis of a Surgical Robot for Minimally Invasive Surgery Analytical and Experimental Approaches," Studies in Health Technology and Informatics—Medicine Meets Virtual Reality (MMVR), 2005, vol. 111, pp. 422-428, IOS Press.

Scharstein D., et al., "High-Accuracy Stereo Depth Maps Using Structured Light," IEEE Computer Society Conference on Computer Vision and Pattern Recognition, 2003, vol. 1, pp. 195-202.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

DEPTH BASED MODIFICATION OF CAPTURED IMAGES

CROSS REFERENCE TO RELATED APPLICATIONS

This application is a continuation of U.S. application Ser. No. 14/210,936 (filed Mar. 14, 2014), which claims benefit of provisional U.S. Application No. 61/793,895 (filed Mar. 15, 2013), each of which is incorporated herein by reference.

FIELD OF THE INVENTION

The present invention generally relates to imaging systems. In particular, it relates to an imaging system, and method implemented therein, for modification of captured images as a function of depth.

BACKGROUND OF THE INVENTION

Imaging systems include an image capture device for capturing images of objects. Significant changes in image quality may occur, however, as a function of the depth of the objects relative to the image capture device. As an example, when the image capture device is a camera, a focal point of the camera will move relative to the objects as the camera moves towards or away from the objects. To compensate for such depth changes, digital cameras are commonly provided with an autofocus (AF) feature. As described in U.S. Pat. No. 7,782,392 B2, conventional electronic camera systems may provide an autofocus feature using either the contrast (e.g., blur) of the captured image or a determined depth value of an object within the field of view of the camera. The depth value may be determined using reflected light and principles of triangulation. In addition to providing an autofocus feature, automatic exposure control (AE) may also be provided to determine the brightness of the object and adjust exposure.

In each of these examples, a control element of the image capture device is adjusted to improve the image quality of captured images. Sometimes, however, either a control element is not available to improve the overall image quality of the captured images or only a portion of the captured image is desired to be modified. In these cases, alternative solutions are desirable.

BRIEF SUMMARY

The embodiments of the invention are summarized by the claims that follow below.

DETAILED DESCRIPTION

Figure 1:
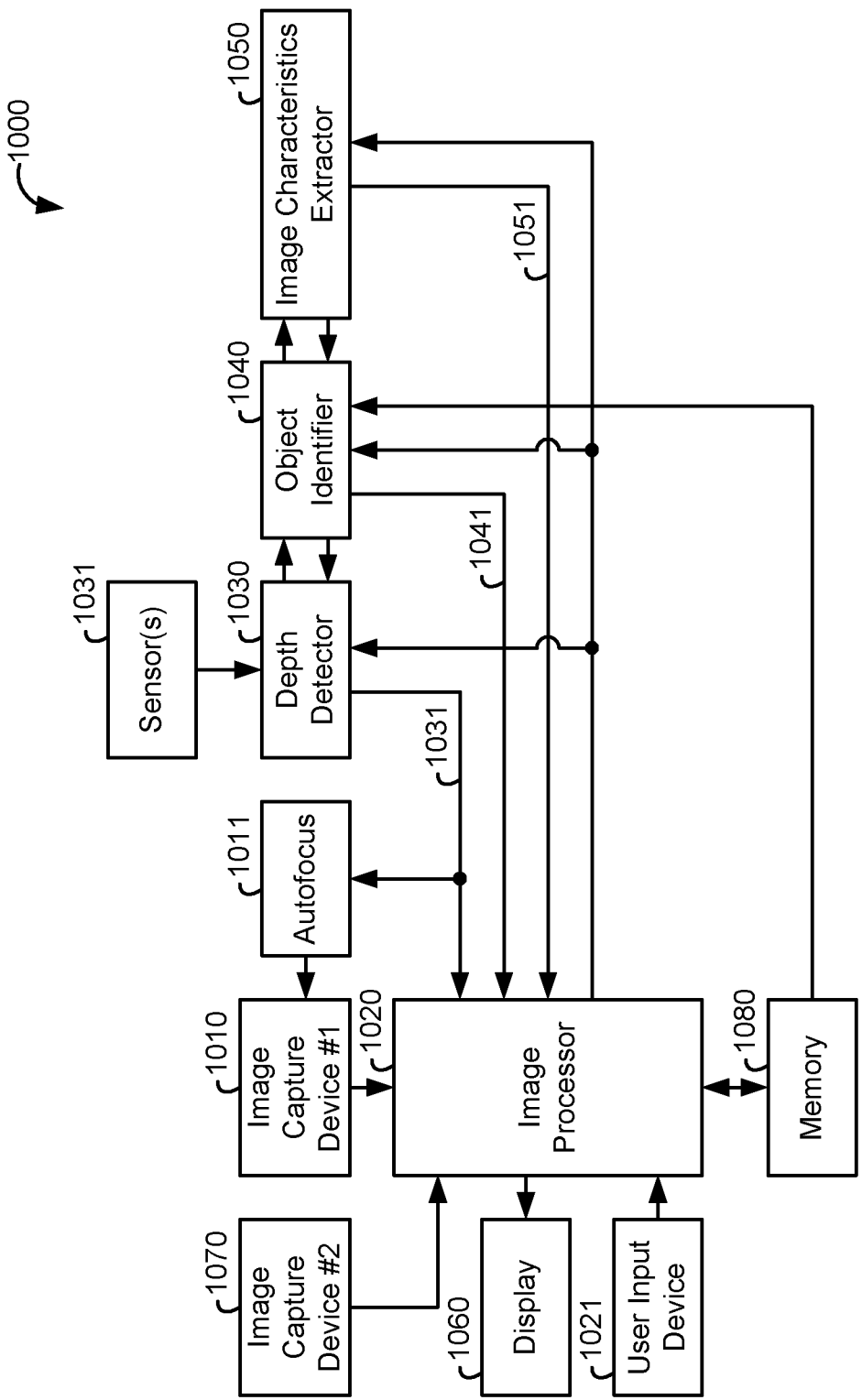
FIG. 1 illustrates a block diagram of an imaging system utilizing aspects of the present invention.

FIG. 1 illustrates, as an example, a block diagram of an imaging system 1000. A first image capture device 1010 is preferably a high-definition digital stereo camera that generates a video stream of stereo images captured at a frame rate of the camera, such as thirty frames per second. Each frame of stereo images includes a left stereo image and a right stereo image. A second image capture device 1070 may capture images using a different imaging modality such as radiography, ultrasound, and magnetic resonance imaging. Although only two image capture devices are shown, the imaging system 1000 may include additional image capture devices of the same or different types.

An image processor 1020 processes the images received from the first image capture device 1010 and displays the processed images on a display 1060. The display 1060 is preferably a stereo viewer having left and right display screens for respectively displaying left and right stereo images derived from the left and right stereo images captured by the image capture device 1010.

The image processor 1020 may also process images received from the second image capture device 1070. In this case, the processed images may be stored in a memory device 1080 for later use and/or displayed on the display 1060. The displayed images derived from the second image capture device 1070 may be spatially registered and superimposed over the displayed images derived from the first image capture device 1010 or they may be displayed in a separate window on a screen of the display 1060.

Normal processing of captured images from the first image capture device 1010 may include modification of the captured images for different resolutions and for camera distortion and/or misalignment correction. In telerobotic operation, such processing may also include modification of the captured images to provide telepresence. Processing of captured images from the second image capture device 1070 may include generating information of three-dimensional computer models of one or more objects in the captured images. Additional details on such image processing may be found, for example, in U.S. Pat. No. 7,107,090 entitled "Devices and Methods for Presenting and Regulating Auxiliary Information on an Image Display of a Telesurgical System to Assist an Operator in Performing a Surgical Procedure", which is incorporated herein by reference.

A user input device 1021 is provided to facilitate user interaction with the imaging system 1000. The user input device 1021 may be any conventional computer input device such as a computer mouse, keyboard, microphone, or digital pen and pad, which may be used alone or as part of a user interface system such as a Graphical User Interface (GUI), voice recognition system, or a telestrator. Additional details on such a telestrator may be found, for example, in U.S. 2007/0156017 entitled "Stereo Telestration for Robotic Surgery", which is incorporated herein by reference.

The imaging system 1000 may be used in a number of applications. For example, it may be used in a medical robotic system such as described in U.S. Pat. No. 6,659,939 entitled "Cooperative Minimally Invasive Telesurgical System," which is incorporated herein by reference.

Figure 2:
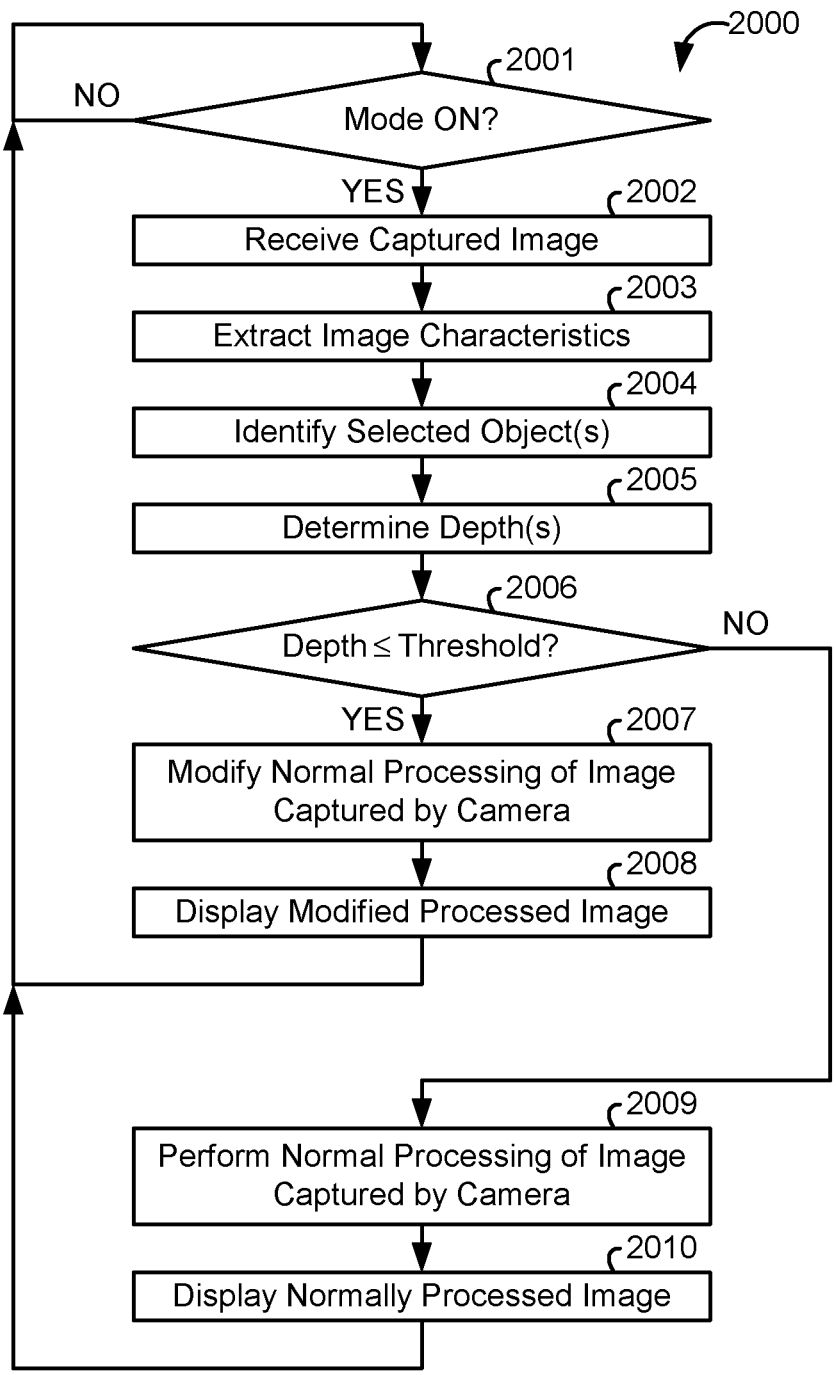
FIG. 2 illustrates a flow diagram of a method utilizing aspects of the present invention for processing a captured image for display.

FIG. 2 illustrates, as an example, a flow diagram of a method 2000 for processing a captured image for display. Program code implementing various blocks of the method is stored non-transitorily in memory 1080 and executed by various components of the imaging system 1000.

In block 2001, the method determines whether or not its processing mode is ON. The user may turn the mode on and off in any one or a number of conventional ways such as turning a switch to ON and OFF positions on the user input device 1021 or voice activating and deactivating the mode with ON and OFF commands spoken into a voice recognition system. Preferably such determination is performed by the image processor 1020 of the imaging system 1000.

In block 2002, the method receives an image of a plurality of objects which has been captured by an image capture device such as image capture device 1010. When the image capture device is a stereoscopic camera, it is to be understood that the term "image" refers to a stereo pair of left and right images captured by the stereoscopic camera. On the other hand, when the image capture device is an ultrasound transducer, it is to be understood that the term "image" refers to a plurality of two-dimensional slices of the plurality of objects. As an example, the received image may show anatomical structures of a patient that have been captured by a stereoscopic endoscope or an ultrasound transducer that has been inserted into the patient. The received image is received and generally processed by the image processor 1020 with certain exceptions for specialized processing as noted below.

In block 2003, the method optionally extracts image characteristics or qualities from the image received in block 2002. Examples of such image characteristics include shapes, sizes, and spatial relationships of objects in the captured images, colors of the objects, brightness of the objects, and sharpness of the edges of the objects. Extraction of the image characteristics or qualities is preferably performed by an image characteristics extractor 1050, which is included in the imaging system 1000 as shown in FIG. 1.

In block 2004, the method optionally identifies one or more user selected objects in the captured image. As explained below, the identification process may depend upon the way the user has selected objects of interest. Regardless of the way the user has selected objects of interest, however, the identification process is preferably performed by an object identifier 1040, which is included in the imaging system 1000 as shown in FIG. 1.

Figure 5:
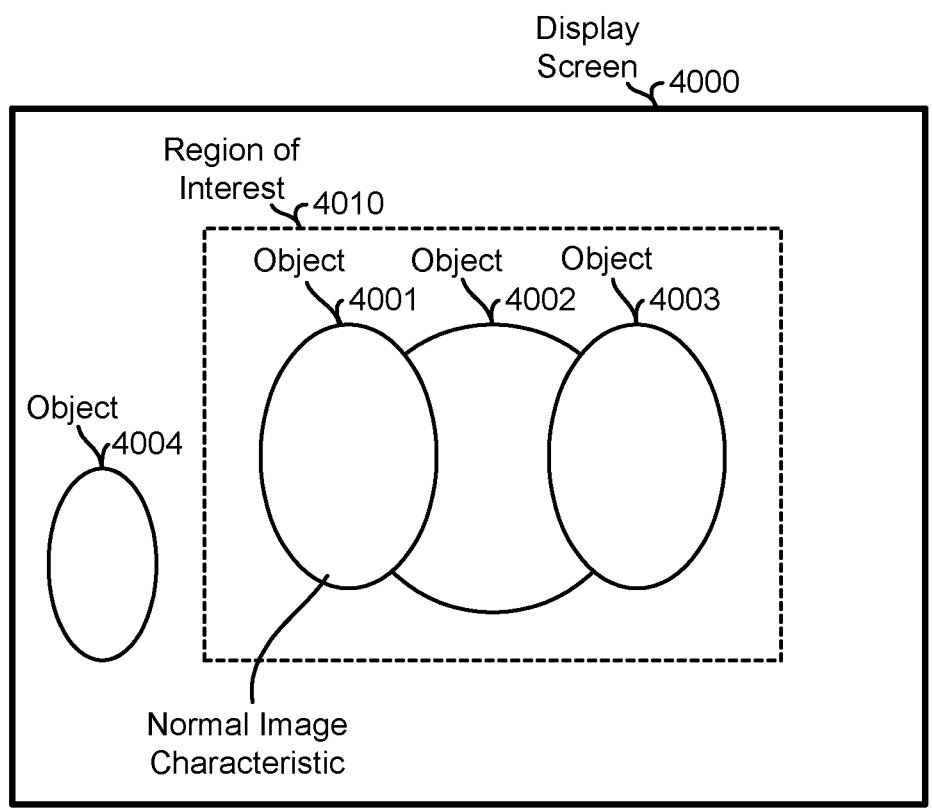
FIG. 5 illustrates a display screen without modification of a captured image by an imaging system utilizing aspects of the present invention.
Figure 6:
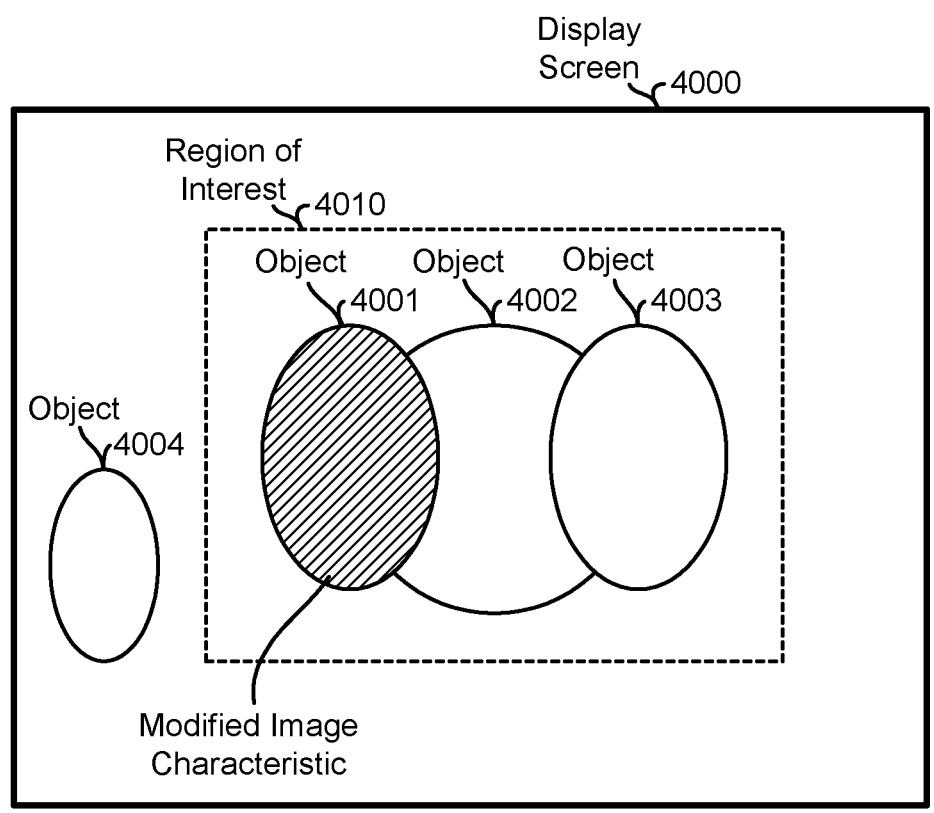
FIG. 6 illustrates a display screen with selective modification of a captured image by an imaging system utilizing aspects of the present invention.

One way the user may select one or more objects of interest is by using the user input device 1021. As an example, the user may identify one or more objects 4001, 4002, 4003 by specifying a region of interest 4010 on a screen 4000 of the display 1060, as shown in FIGS. 5 and 6, by interacting with a GUI or by using a telestrator to position and/or draw the region of interest about the objects of interest. Note that in the examples shown in FIGS. 5 and 6, the object 4004 is not selected by the user. As another example, the user may specify the region of interest by commanding movement of a cursor on the screen of the display 1060 and providing an indication that an area circumscribed by the movement of the cursor is to be selected as the region of interest by clicking a button on the user input device 1021. As still another example, the user may simply indicate each of the objects of interest by moving the cursor on the screen so that it is over each of the objects of interest and clicking the button to indicate its selection. In each of these examples, identification of the selected objects is straightforward since the user has identified the selected objects on the screen of the display 1060.

Another way the user may select one or more objects of interest is by pre-specifying the objects on a different image which has been captured by a second image capture device such as the image capture device 1070 and displayed on the screen of the display 1060, or another display, at a previous time. In this case, the information of the selected objects may be stored in the memory 1080 along with information of the image captured by the second image capture device. As an example, when the second image capture device captures computer tomography scan images of the plurality of objects, the image processor 1020 may generate a three-dimensional model of the plurality of objects and display the three-dimensional model on the display 1060. The user may then select one or more of the objects using the user input device 1021 as previously described. In this case, identification of the selected objects requires spatially registering the three-dimensional model of the plurality of objects retrieved from the memory 1080 with the image of the plurality of objects in the captured image received in block 2002 so that objects in the received image may be identified that correspond with the selected objects indicated with respect to the three-dimensional model.

Still another way the user may select one or more objects of interest is by naming the objects vocally and using a voice recognition system or by naming the objects through interaction with the imaging system using the user input device 1021. As an example of the latter case, when the user input device 1021 is a computer keyboard, the user may simply type in the names of the objects. As another example, when the user input device 1021 is a computer mouse, the user may indicate the names of the objects using a pull-down menu with selectable items. After receiving the names of the objects, the method may then employ an algorithm that identifies the named objects in the received image by using known colors, shapes, relatively sizes, and spatial relationships of the named objects and other objects in the captured image.

In block 2005, the method determines a depth corresponding to the one or more objects selected in block 2004 or corresponding to the plurality of objects if no objects have been specifically selected by the user. The depth determination is preferably performed by a depth detector 1030, which is included in the imaging system 1000 as shown in FIG. 1.

Figure 3:
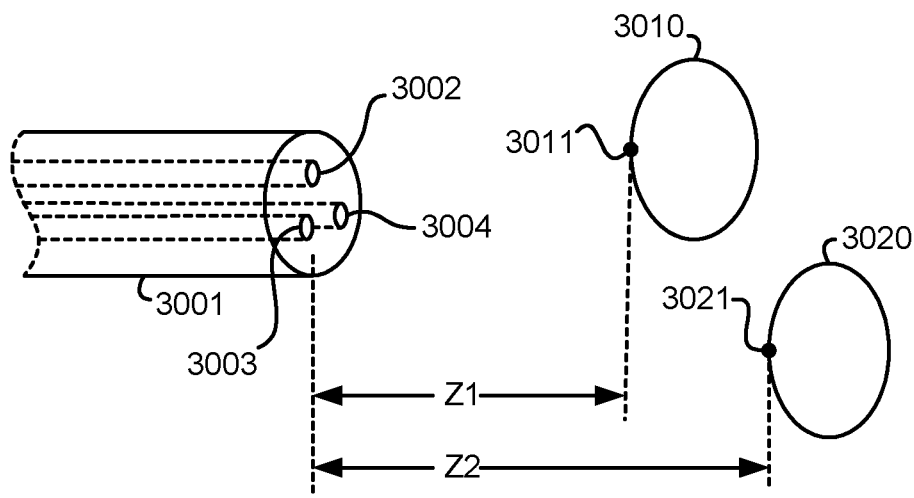
FIG. 3 illustrates a schematic of a plurality of objects whose image is being captured by one or more image capture devices while being illuminated by a light source as used in an imaging system utilizing aspects of the present invention.

When a plurality of objects is in the field of view of the image capture device, each of the objects is disposed at a depth relative to the image capture device. As an example, FIG. 3 illustrates a first object 3010 which is at a depth Z1 relative to an image capture device 3003 disposed within a guide tube 3001. Also disposed in the guide tube 3001 are a light source 3002 and an ultrasound transducer 3004. The depth Z1 is the distance from the image capturing end of the image capture device 3003 and a closest point 3011 on the first object 3010. Likewise, a second object 3020 is shown which is at a depth Z2 relative to the image capture device 3003, wherein the depth Z2 is the distance from the image capturing end of the image capture device 3003 and a closest point 3021 on the second object 3020. In this example, the depth corresponding to the objects 3010 and 3020 may be the depth Z1 corresponding to the depth to the closest object 3010 to the image capture device 3003, or it may be the depth Z2 corresponding to the depth to the farthest object 3020 from the image capture device 3003, or it may be a depth which is between the depths Z1 and Z2 such as an average of the two. Alternatively, the individual depths of all selected objects may be used in subsequent processing of the method as described below.

The determination of the depth to an object may be performed using one or a combination of known methods. As an example, a structured light technique may be used in which a known light pattern is projected onto the target area and the relative light intensities on the scene tracked by sensors 1031 to derive a depth map for the scene. See, e.g., Daniel Scharstein and Richard Szeliski, "High-Accuracy Stereo Depth Maps Using Structured Light," IEEE Computer Society Conference on Computer Vision and Pattern Recognition (CVPR 2003), vol. 1, pages 195-202, Madison, Wis., June 2003. As another example, the depth may be determined by determining corresponding points in stereo images using a robust sparse image matching algorithm, determining disparities between the corresponding points, and converting the disparities to depths using a predetermined disparity to depth mapping. See, e.g., U.S. Pat. No. 8,184,880 entitled "Robust Sparse Image Matching for Robotic Surgery", which is incorporated herein by reference. As yet another example, a laser range finder may be included in the imaging system 1000 with sensors 1031 coupled to the depth detector 1030 for determining depth values of a three-dimensional scene.

In addition to using the determined depth for processing in subsequent blocks of the method, the depth may be provided to an autofocus unit 1011 which controls focusing of the image capture device 1010, such as shown in the imaging system 1000 of FIG. 1.

In block 2006, the method determines whether the depth is less than or equal to a threshold depth. The threshold depth may be empirically determined to avoid inadvertent modifications in block 2007 due to noise and it may be pre-programmed into the image processor 1020 or stored in the memory 1080 of the imaging system 1000 as a default value. Alternatively, the threshold depth value may be a function of a characteristic of an image captured by the image capture device 1010. Additionally, or alternatively, it may be specified and/or altered by the user in a conventional manner to accommodate specific user preferences.

Although use of a single threshold depth is described above, it is to be appreciated that a plurality of threshold depth values may be used in the method. For example, each threshold depth may correspond to a different desirable modification of the captured image.

If the determination in block 2006 is NO, then the method jumps ahead to block 2009 to perform normal processing of the captured image which was received in block 2002. Processing of the image is preferably performed by the image processor 1020 of the imaging system 1000. In block 2010, the normally processed image is then displayed on the display 1060, such as shown in FIG. 5. The method then jumps back to block 2001 to process another image received from the image capture device so that subsequent frames of the video stream are processed through blocks 2001-2008 or 2001-2010.

On the other hand, if the determination in block 2006 is YES, then the method proceeds to block 2007. In block 2007, the method modifies the normal processing of the image received in block 2002 according to a function of at least the depth determined in block 2005. Again, processing of the image is preferably performed by the image processor 1020 of the imaging system 1000. Different image characteristics may require different modifications as a function of depth. In certain applications the modification may also be a function of an image characteristic such as color. As an example of this latter type of application, darker colored objects may require a brightness level that is higher than lighter colored objects.

Figure 4:
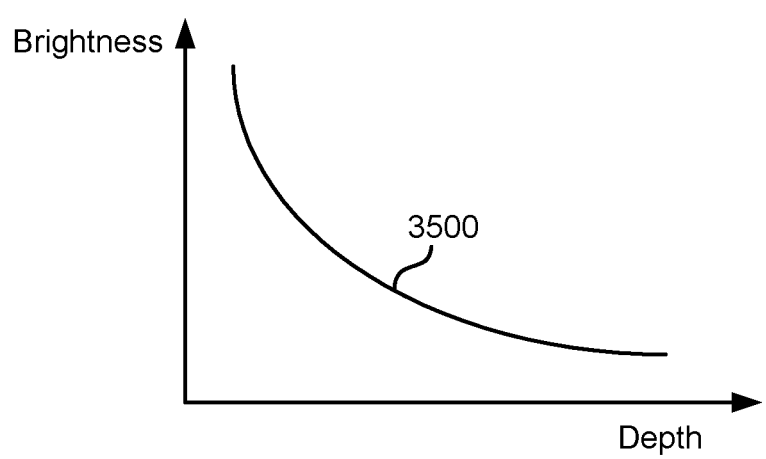
FIG. 4 illustrates a relationship of brightness versus depth which may be used in an imaging system utilizing aspects of the present invention.

As an example, when the image characteristic is brightness, objects closer to the light source may appear brighter than objects farther away from the light source according to a relationship of brightness versus depth such as shown in FIG. 4. Likewise, when the image characteristic is the fluorescence of an object, more fluorescence may be seen from closer objects than that seen from farther objects. In certain applications, such depth related variations may obscure desired processing results. For example, in a medical application, it may be desired to distinguish the different amount of ICG (IndoCyanine Green) stored in different Lymph nodes so that the sentinel Lymph node may be identified on the display 1060 by a user. Therefore, in this case, the method may modify the normal image processing by modifying the image of each of the objects (e.g., Lymph nodes) according to a function of its depth so that the objects are each scaled to a common depth for comparison purposes.

As another example, normal image processing may be performed on the captured images to enhance the images. As an example, the images may be filtered to enhance the sharpness of edges of the objects in the captured images. In this case, it may be desirable to modify the normal processing by turning down the amount of image sharpening to create more pleasant images with less noise increases by modifying the filtering of the images at close range. Various other image processing operations that can be performed according to depth will be readily apparent, such as contrast adjustment (e.g., increasing contrast for closer structures to more clearly distinguish fine details), saturation (i.e., increasing and/or decreasing specific color intensities when close to a scene to enable visualization of subtle tissue variations), among others.

In certain applications, such as medical imaging, it may be advantageous to selectively modify image data as a function of depth rather than process all of the image data in the same fashion as described previously with respect to filtering. For example, it may be desirable to process the images of different objects in different manners as a function of their depths relative to the image capture device. In particular, it may be desirable to modify the image data for a selected one of the objects while not modifying images of others of the objects in the captured images. As another example, it may be desirable to modify filtering of the image data as a function of the depth of a selected one or more of the objects in the captured images. Accordingly, selective modification of the image data is preferably performed in block 2007 for such applications.

After generating a displayable image in block 2007 by modifying the image of one or more of the plurality of objects in the captured image according to at least the depth, in block 2008, the displayable image is then displayed on the display 1060, such as shown in FIG. 6. The method then jumps back to block 2001 to process another image received from the image capture device so that subsequent frames of the video stream are processed through blocks 2001-2008 or 2001-2010.

Although the image processor 1020, depth detector 1030, object identifier 1040, and image characteristics extractor 1050 are shown as being different components in FIG. 1, it is to be appreciated that their processing may be performed in a single processor or a cooperatively by a plurality of processors, which in turn, may be implemented by any combination of hardware, firmware, and software in a conventional manner.

Although the various aspects of the present invention have been described with respect to a preferred embodiment, it will be understood that the invention is entitled to full protection within the full scope of the appended claims.

What is claimed is:

1. A video processing and display method comprising:
   a processor receiving video information of a plurality of objects, wherein the video information corresponds to a video which has been captured by an image capture device, wherein the plurality of objects includes one or more selected objects and at least one non-selected object;
   the processor determining a depth corresponding to the one or more selected objects relative to the image capture device;
   the processor generating modified video information by modifying the video information of the one or more selected objects according to a function of at least the depth, so that the modified video information corresponds to a modified video; and
   the processor providing the modified video information to a display controller for displaying the modified video on a display;
   wherein each of the one or more selected objects comprises a plurality of lymph nodes;
   wherein each of the plurality of lymph nodes stores an amount of IndoCyanine Green; and
   wherein the processor generating the modified video information comprises the processor generating the modified video information by modifying video information of the plurality of lymph nodes so that fluorescences resulting from the amounts of IndoCyanine Green stored in the plurality of lymph nodes are scaled to a common depth for comparison purposes in order to identify a sentinel node among the plurality of lymph nodes.

2. The video processing and display method of claim 1, wherein the function of at least the depth comprises a function of both the depth and an image characteristic; and
   wherein the processor generating the modified video information comprises the processor generating the modified video information by modifying the, or another, image characteristic of the one or more selected objects in the video information according to the function of both the depth and the image characteristic.

3. The video processing and display method of claim 1, further comprising:
   the processor determining whether a condition has been met;
   wherein the processor generating the modified video information comprises the processor generating the modified video information only after the processor has determined that the condition has been met.

4. The video processing and display method of claim 3, wherein the condition comprises the depth corresponding to the one or more selected objects being less than or equal to a depth threshold.

5. The video processing and display method of claim 1, further comprising:
   the processor receiving object selection information from a memory device; and
   the processor identifying the one or more selected objects in the video information by using the object selection information.

6. The video processing and display method of claim 1, further comprising:
   before the processor generates the modified video information,
      the processor providing the video information to the display controller for displaying the video on the display,
      the processor receiving object selection information from a user interface operated by a user as the user is viewing the video on the display; and
      the processor identifying the one or more selected objects in the video information by using the object selection information.

* * * * *